July 1, 1958            B. WEIL            2,841,438
STRETCHER HAVING A COLLAPSIBLE UNDERCARRIAGE
Filed Sept. 13, 1956
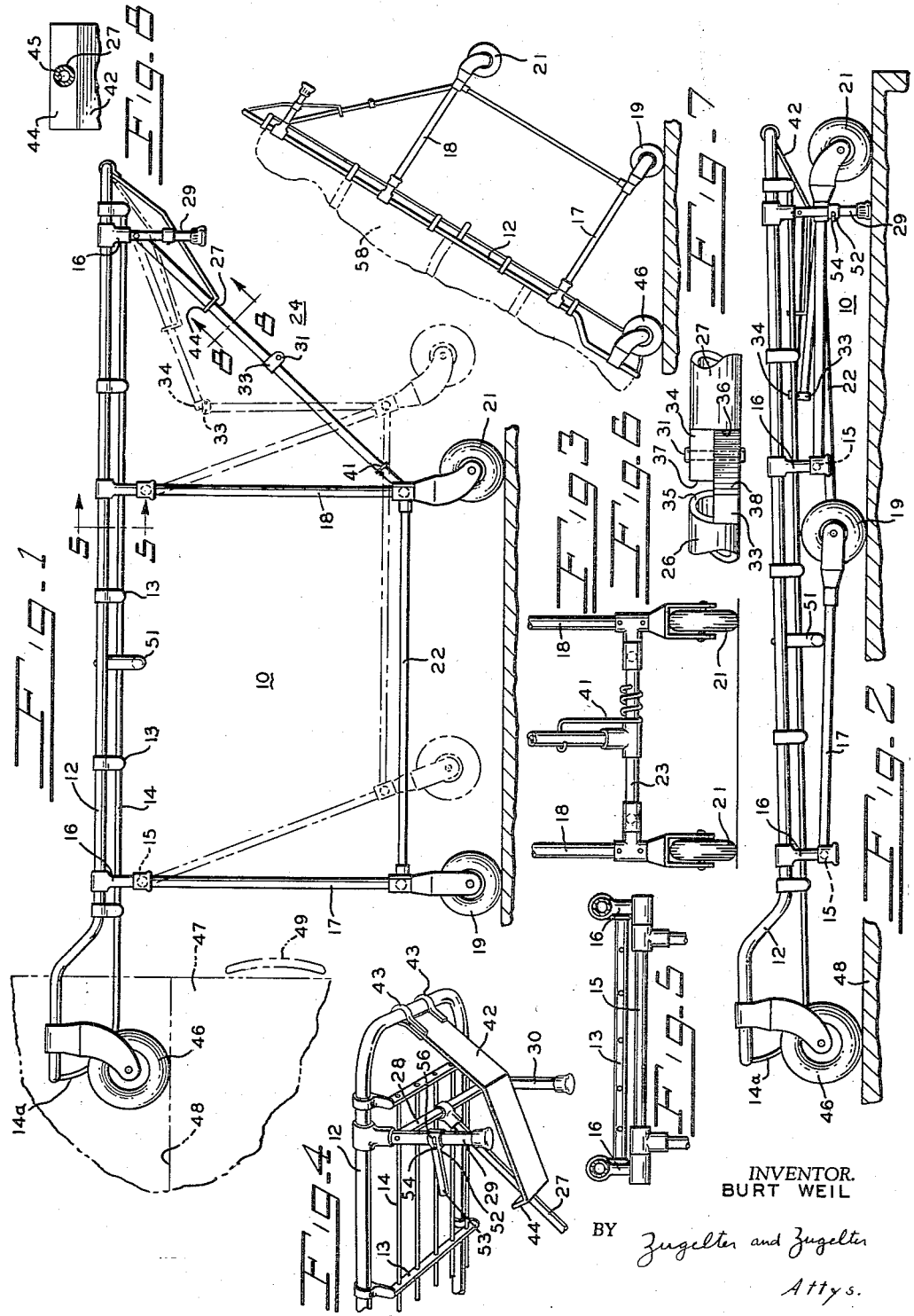
INVENTOR.
BURT WEIL

United States Patent Office 2,841,438
Patented July 1, 1958

2,841,438

STRETCHER HAVING A COLLAPSIBLE UNDERCARRIAGE

Burt Weil, Cincinnati, Ohio

Application September 13, 1956, Serial No. 609,722

6 Claims. (Cl. 296—20)

This invention relates to a cart or stretcher having a collapsible framework or undercarriage.

An object of this invention is to provide a cart having an undercarriage which supports a bed portion of the cart at an elevated position and which is adapted to collapse against the under side of the bed portion so that the cart can be carried inside a vehicle.

A further object of this invention is to provide a cart which can be rolled to a vehicle with the undercarriage holding the bed portion of the cart at an elevated position above the level of the floor of the vehicle, the cart having auxiliary wheels at one end of the bed thereof which can ride on the floor of the vehicle to support that end of the cart while the cart is advanced into the vehicle and the undercarriage is collapsed.

A further object of this invention is to provide a cart of this type having an undercarriage locking arrangement which locks the undercarriage in elevated position in which the locking mechanism is provided with a release which can be actuated by the knee of a person who supports the end of the cart remote from the auxiliary wheels to release the lock as the cart is advanced into the vehicle so that the legs of the undercarriage can swing to a position against the under side of the cart as the cart is advanced into the vehicle.

The above and other objects and features of the invention will in part be apparent and will in part be obvious to those skilled in the art to which this invention pertains from the following detailed description, and the drawing, in which:

Figure 1 is a view in side elevation showing a cart constructed in accordance with an embodiment of this invention, a fragmentary portion of a vehicle being shown in dot-dash lines in association therewith, the undercarriage of the cart being shown in dot-dash lines in partly collapsed position;

Fig. 2 is a view in side elevation of the cart, showing the undercarriage in fully collapsed position;

Fig. 3 is a fragmentary view in end elevation showing the lower portion of the rear leg structure;

Fig. 4 is a fragmentary perspective view of the rear portion of the cart showing the framework in elevated position;

Fig. 5 is a view in section taken on the line 5—5 in Fig. 1;

Fig. 6 is an enlarged fragmentary view of the hinge of the locking arrangement of the cart, the hinge being shown in partly collapsed position;

Fig. 7 is a somewhat schematic view in side elevation showing the cart in elevated position and resting at an angle on a supporting floor; and Fig. 8 is a view in section taken on the line 8—8 in Fig. 1.

In the following detailed description, and the drawing, like reference characters indicate like parts.

In the drawing is shown a cart 10 constructed in accordance with an embodiment of this invention. The cart 10 includes an elongated, hollow frame member 12 which may be formed of metal tubing, or the like. Cross members 13 extend across the frame 12 and support a plurality of parallel rods 14 which extend lengthwise of the frame 12 to form a bed portion for the cart of the type used in ambulance or morticians' carts. At one end of the frame member 12, ends of the rods 14 are turned upwardly, as indicated at 14a, and are attached to the frame member 12.

Below the frame 12 are mounted hinge rods 15 (see Figs. 1, 2 and 5). The hinge rods are connected to the frame member 12 by brackets 16. On the hinge rods 15 are pivotally mounted forward leg members 17 and rear leg members 18. As shown in Figs. 1 and 2, the leg members can swing from an upright position shown in full lines in Fig. 1, through an intermediate position shown in dot-dash lines in Fig. 1, to the retracted position shown in Fig. 2. The lower ends of the forward leg members 17 carry wheels 19, and the lower ends of the rear leg members 18 carry caster wheels 21. The lower ends of the leg members immediately above the wheels and casters are linked together by lengthwise links 22 and cross bars 23 (see Fig. 3), only one of which is shown, so that the leg members fold in unison.

The leg members, wheels, and casters form an undercarriage for supporting the bed portion of the cart in the horizontal elevated position shown in Fig. 1. The legs, when unfolded to the lowered or extended position in which they are shown in Figure 1, are held in such position by a releasable locking arrangement indicated generally at 24 in Fig. 1. The locking arrangement includes lower and upper toggle links indicated at 26 and 27, respectively. The lower end of lower toggle link 26 is pivotally mounted on the rear cross bar 23. The upper end of the upper toggle link 27, as shown in Fig. 4, is pivotally mounted on a cross member 28, which extends transversely of the frame near one end thereof. The cross member 28 spans two short or stub legs 29 and 30 which are rigidly mounted on the frame 12. Adjacent ends of the toggle links are connected by a pivot pin 31.

The pivot pin 31 is mounted in hinge lugs 33 and 34. As shown most clearly in Fig. 6, hinge lug 33 is rigidly attached to the upper end of lower arm 26 and hinge lug 34 is rigidly attached to the lower end of upper arm 27. The lower toggle link 26 terminates in a flat face 35, and the upper toggle link 27 terminates in a flat face 36. The hinge lug 33 is attached to and overlies one-half of the face 35. The other half of the face 35 is aligned with and can engage a face 37 on lug 34. Similarly, the hinge lug 34 is attached to and overlies one-half of the face 36, and the other half of the face 36 can engage a face 38 on the lug 33. When the undercarriage is in elevated position, the toggle links reach the position shown in Fig. 1, in which the hinge lugs are aligned and bind against the faces 37 and 38 (see Fig. 6) of the toggle links. As shown in Fig. 3, a spring 41 is mounted on cross rod 23 and urges the toggle links toward the position in which the undercarriage is elevated and the lugs and toggle links bind.

As shown most clearly in Fig. 4, a latch releasing plate 42 is pivotally mounted on the rear portion of frame 12. The upper end of latch releasing plate 42 carries split ring brackets 43 which extend around the frame 12 and are attached to the plate 42 to pivotally support the plate 42. The lower end of the latch releasing plate 42 is provided with a flange 44 having an opening 45 (see Fig. 8) therethrough. The upper toggle link 27 extends through the opening 45. When the latch release plate 42 is pushed upwardly, as shown in Fig. 1, it swings the latching mechanism from the full line position to the dot-dash line position, releasing the latching mechanism.

As shown in Figs. 1 and 2, the frame 12 carries two auxiliary wheels 46 which are at the forward end thereof, i. e., at the end remote from the latching mechanism. The wheels 46 (only one of which is shown) are mounted on opposite sides of the frame 12 and extend below the bed of the cart. As shown in Fig. 1, when the cart is in elevated position, the auxiliary wheels 46 can be advanced into the rear end of a vehicle 47, such as a hearse, ambulance, or the like having a floor 48 on which the wheels 46 can ride. When the cart is to be advanced into the vehicle, the forward end of the cart and the wheels 46 are pushed into the vehicle to the position shown in Fig. 1. Then the operator, stationed at the other end of the cart, can support the cart by himself at the rear end adjacent the latch releasing plate 42. As the cart is advanced into the vehicle, the operator can kick the latch releasing plate 42 with his knee to release the latch and permit the legs of the undercarriage to swing to the position shown in dot-dash lines in Fig. 1. Then, as the cart is advanced farther into the vehicle, the front legs 17 of the cart may engage a bumper 49 of the vehicle 47 or the rear end of the body thereof, so that, as the cart is advanced into the vehicle, the legs swing upwardly toward the retracted position of Fig. 2.

When the legs reach the position shown in Fig. 2, the front legs 17 engage a transverse strengthening member 51 which spans the sides of the frame 12 and is attached thereto. Thus, the swinging of the legs is limited to the position shown in Fig. 2, in which the front wheels 19 are below but only slightly spaced from the bed portion of the cart. In this position, the wheels 19, as well as the auxiliary wheels 46 can ride on the floor 48 of the vehicle, as shown in Fig. 2. Then, when the cart is advanced farther into the vehicle, the cart can be set down upon the stub legs 29 and 30 which hold and support the rear end of the cart inside the vehicle.

As shown in Fig. 4, leg retainers 52 (only one of which is shown) are mounted on the stub legs 29 and 30. Each of the retainers 52 includes an arm 53 which can swing from a released position, as shown in Fig. 4, to a leg-holding position, shown in Fig. 2. In the leg-holding position, the arm underlies the undercarriage to hold the undercarriage in retracted position. As shown most clearly in Fig. 4, a pin 54 is mounted in stub leg 29 and extends through a slot 56 in the retainer 52 to limit the swinging thereof.

When the cart is to be removed from the vehicle, the leg retainers 52 may be released and the cart may be rolled out of the vehicle. As the cart is rolled backwardly out of the vehicle, the undercarriage automatically swings down to the elevated position of Fig. 1 and the toggle links swing to the position shown in full lines in Fig. 1, swinging past center to binding position under the urging of the spring 41.

When the cart is in elevated position it can be supported on the front wheels 19 and the auxiliary wheels 46 in the position shown in Fig. 7, so that the cart with a load 58 thereon may be readily carried in an elevator or the like (not shown).

The cart can be handled by a single operator without need for assistance in raising or lowering the cart.

The cart illustrated in the drawings and described above, is subject to structural modification without departing from the spirit and scope of the appended claims.

Having described my invention, what I claim as new and desire to secure by Letters Patent is:

1. A cart having an elongated bed, leg means swingably mounted on the under side of said bed at the front and rear portions thereof, wheel means mounted on the free end of the leg means and swingable with the leg means between an extended position in which the bed is fully supported horizontally by the wheel means at an elevated height, and a retracted position in which the leg means and the wheel means are adjacent the under side of the bed, auxiliary wheel means mounted immediately below the bed at a front end thereof, the auxiliary wheel means being adapted to run on the floor of a vehicle to support the front end of the cart, a toggle lock extending from the bed adjacent but spaced forwardly of the rear end, to the leg means, said toggle lock comprising toggle links pivotally connected to the bed and to the leg means, a hinge between the toggle links and means on the hinge for locking when the leg means is in extended position, the rear end of the bed being supportable by an operator when the front end is supported by the auxiliary wheels, a plate pivotally mounted at its upper end on the bed rearwardly of the toggle links, and means on the lower end of the plate engaging one of the toggle links, the plate being engageable by the knee of the operator for swinging the toggle links toward released position, the leg means being engageable with the vehicle as the cart is advanced into the vehicle to swing the leg means to retracted position.

2. An ambulance cart having an elongated bed, leg means swingably mounted on the bed at the front and rear portions thereof, wheel means mounted on the free ends of the leg means and swingable with the leg means between an extended position in which the bed is fully supported horizontally at an elevated height by the leg and wheel means and a retracted position in which the leg and wheel means are adjacent the underside of the bed, auxiliary wheel means mounted substantially in the plane of the bed at the front end thereof, the auxiliary wheel means being adapted to run on the floor of a vehicle to support the front end of the bed, the rear end of the bed being supportable by an operator while the front end is supported by the said auxiliary wheel means, releasable means to hold the said leg means in extended position, said releasable means including a member movably positioned beneath the bed at the rear end thereof, said member being actuably engageable by the leg of an operator who is stationed at the rear end of said cart whereby the operator is enabled to move the said releasable means to cart leg releasing position without moving from his station, the said leg means of said cart being engageable with the vehicle as the cart is advanced into the vehicle to swing the leg means of said cart into retracted position.

3. A cart having an elongated bed, legs swingably mounted at the respective front and rear portions of said bed, said legs respectively having wheels at the lower ends thereof, said legs being swingable between an extended position in which the bed is fully supported horizontally at an elevated height by said legs and a retracted position in which the legs are adjacent the underside of the bed, auxiliary wheel means mounted approximately in the plane of said bed at the front end thereof, the rear end of said bed being supportable by an operator and the auxiliary wheel means being adapted to run on the floor of a vehicle to support the front end of the cart when the legs are in retracted position, releasable toggle link means bracing said legs diagonally with respect to said bed when said legs are in extended position, said toggle link means including a member movably positioned beneath the bed at the rear end thereof, the said member being movable to toggle releasing position by an operator stationed at the rear end of the bed through the operator's movement of a leg portion of his body into actuating engagement with said movable member, the said legs of said cart being engageable with the vehicle as the cart is advanced into the vehicle by the operator, for automatically swinging the legs of the cart to retracted position when the legs of the cart are released and the said legs automatically swinging to extended position as the cart is withdrawn from the vehicle.

4. A cart having an elongated bed, legs swingably mounted at the respective front and rear portions of said bed, said legs respectively having wheels at the lower ends thereof, said legs being swingable between an extended position in which the bed is fully supported horizontally at an elevated height by said legs and a retracted position in which the legs are adjacent the underside of the bed, auxiliary wheel means mounted approximately in the plane of said bed at the front end thereof, the said legs being engageable with a vehicle as the cart is advanced into it to automatically swing the legs to retracted position and the said auxiliary wheel means being adapted to run on the floor of the vehicle to support the front end of the cart as the legs swing to retracted position, and releasable leg-locking means for holding the legs in extended position, the said releasable means including a movable releasing member positioned beneath the bed at the rear end thereof for actuation by the leg of an operator who is grasping the rear end of the bed in readiness to support the same upon swinging movement of the legs to retracted position as the cart is advanced into the vehicle, the said releasable means being responsive to operator-actuated movement of said movable releasing member to unlock the legs and thereby enable them to be swung to retracted position.

5. A cart having an elongated bed, legs swingably mounted at the respective front and rear portions of said bed, said legs respectively having wheels at the lower ends thereof, said legs being swingable between an extended position in which the bed is fully supported horizontally at an elevated height by said legs and a retracted position in which the legs are adjacent the underside of the bed, auxiliary wheel means mounted approximately in the plane of said bed at the front end thereof, the rear end of said bed being supportable by an operator and the auxiliary wheel means being adapted to run on the floor of a vehicle to support the front end of the cart when the legs are in retracted position, spring means urging said legs to extended position, releasable toggle link means bracing said legs diagonally with respect to said bed when said legs are in extended position, said toggle link means including a member movably positioned beneath the bed at the rear end thereof, the said member being movable to toggle releasing position by an operator stationed at the rear end of the bed while supporting the same through the operator's movement of a leg portion of his body into actuating engagement with said movable member, the said legs of said cart being engageable with the vehicle as the cart is advanced into the vehicle by the operator, for automatically swinging the said cart legs to retracted position when the legs of the cart are released and the said legs automatically swinging to extended position as the cart is withdrawn from the vehicle.

6. A cart having an elongated bed, legs swingably mounted at the respective front and rear portions of said bed, said legs respectively having wheels at the lower ends thereof, said legs being swingable between an extended position in which the bed is fully supported horizontally at an elevated height by said legs and a retracted position in which the legs are adjacent the underside of the bed, auxiliary wheel means mounted approximately in the plane of said bed at the front end thereof, the rear end of said bed being supportable by an operator and the auxiliary wheel means being adapted to run on the floor of a vehicle to support the front end of the cart when the legs are in retracted position, releasable toggle link means bracing said legs diagonally with respect to said bed when said legs are in extended position, said toggle link means including a member of substantial breadth in the direction transverse of said cart movably positioned beneath the bed at the rear end thereof, the said member being movable to toggle releasing position by an operator stationed at the rear end of the bed through the operator's movement of a leg portion of his body into actuating engagement with said movable member, the said legs of said cart being engageable with the vehicle as the cart is advanced into the vehicle by the operator for automatically swinging the legs of the cart to retracted position when the legs of the cart are released and the said legs automatically swinging to extended position as the cart is withdrawn from the vehicle.

References Cited in the file of this patent

UNITED STATES PATENTS

| 2,564,333 | Kelly | Aug. 14, 1951 |
| 2,747,919 | Ferneau | May 29, 1956 |

FOREIGN PATENTS

| 864,489 | France | Jan. 17, 1941 |
| 1,097,953 | France | Feb. 23, 1955 |
| 25,429 | Great Britain | of 1911 |
| 345,843 | Great Britain | Apr. 2, 1931 |
| 369,456 | Great Britain | Mar. 24, 1932 |